(12) United States Patent
Yadav et al.

(10) Patent No.: US 8,569,067 B2
(45) Date of Patent: Oct. 29, 2013

(54) METHOD AND APPARATUS FOR EVALUATING EX-SITU CHEMICAL DEGRADATION OF MEMBRANES

(75) Inventors: Rameshwar Yadav, Farmington, MI (US); Kevork Adjemian, Birmingham, MI (US)

(73) Assignee: Nissan North America, Inc., Franklin, TN (US)

( * ) Notice: Subject to any disclaimer, the term of this patent is extended or adjusted under 35 U.S.C. 154(b) by 97 days.

(21) Appl. No.: 13/327,051

(22) Filed: Dec. 15, 2011

(65) Prior Publication Data
US 2013/0153441 A1   Jun. 20, 2013

(51) Int. Cl.
*G01N 33/00*   (2006.01)

(52) U.S. Cl.
USPC .............................................. 436/5; 436/125

(58) Field of Classification Search
USPC ...................................... 436/5, 125
See application file for complete search history.

(56) References Cited

PUBLICATIONS

Healy et al., "Aspects of the Chemical Degradation of PFSA Ionomers used in PEM Fuel Cells", Fuel Cells 2005, 5, No. 2, pp. 302-308.*

Ghassemzadeh, Kreuer, Maier, and Muller, "Evaluating chemical degradation of proton conducting perfluorosulfonic acid ionomers in a Fenton test by solid-state 19 FNMR spectroscopy", Journal of Power Sources, 196 (2011), 2490-2497.
Hommura, Kawahara, Shimohira, and Teraoka, "Development of a method for clarifying the perfluorosulfonated membrane degradation mechanism in a fuel cell environment", 155 (1), (2008), A29-A33.
Qiao, Saito, Hayamizu and Okada, "Degradation of perfluorinated ionomer membranes for PEM fuel cells during processing with H2O2", Journal of the Electrochemical Society, 153 (6), (2006), A967-A974.
Wang, Tang, Pan, and Li, "Ex-situ investigation of the proton exchange membrane chemical decomposition", International Journal of Hydrogen Energy, 33, (2008), 2283-2288.

\* cited by examiner

*Primary Examiner* — Monique Cole
(74) *Attorney, Agent, or Firm* — Young, Basile, Hanlon & MacFarlane, P.C.

(57) ABSTRACT

Disclosed herein are methods and devices for evaluating ex-situ chemical degradation of fuel cell membranes. One embodiment of a method for evaluating ex-situ chemical degradation of a membrane comprises submerging a membrane in Fenton solution in a reaction vessel with a non-reactive weight configured to maximize exposure of the membrane to the Fenton solution, sealing the reaction vessel, heating the reaction vessel at a fixed rate to a predetermined temperature, holding the reaction vessel at the predetermined temperature for a predetermined test period, cooling the reaction vessel to room temperature, removing the membrane and analyzing the Fenton solution for fluoride ions.

20 Claims, 5 Drawing Sheets

US 8,569,067 B2

METHOD AND APPARATUS FOR EVALUATING EX-SITU CHEMICAL DEGRADATION OF MEMBRANES

TECHNICAL FIELD

The invention relates to the field of methods and devices for measuring parameters of a membrane sample, and in particular to a method and device for measuring chemical degradation of the membrane sample.

BACKGROUND

Fuel cells efficiently and electrochemically convert fuel into electric current, which may then be used to power electric circuits, such as drive systems for vehicles. Fuel cells typically include an electrolyte substance. One common electrolyte substance that is utilized in fuel cells is a proton-exchange membrane (PEM), such as Nafion, which is often used in fuel cells that are utilized to power vehicles. PEMs function by conducting protons from a fuel source, while at the same time acting as a barrier to electrons from the fuel source. The electrons are rerouted to the electric load of the fuel cell.

PEMs can provide the required durability and chemical stability for use in many applications. However, increasing durability and chemical stability is desired to further expand PEM's commercial applications into areas such as automotive fuel cells. The need exists, especially in the field of automotive fuel cells, for a device and method of evaluating the durability and chemical stability of PEMs cost effectively, accurately and repeatedly.

SUMMARY

Disclosed herein are methods and devices for evaluating ex-situ chemical degradation of fuel cell membranes. One embodiment of a method for evaluating ex-situ chemical degradation of a membrane comprises submerging a membrane in Fenton solution in a reaction vessel with a non-reactive weight configured to maximize exposure of the membrane to the Fenton solution, sealing the reaction vessel, heating the reaction vessel at a fixed rate to a predetermined temperature, holding the reaction vessel at the predetermined temperature for a predetermined test period, cooling the reaction vessel to room temperature, removing the membrane and analyzing the Fenton solution for fluoride ions.

An embodiment of a test assembly for measuring the chemical degradation of a membrane disclosed herein comprises a reaction vessel having a single sealable opening having Fenton solution, a non-reactive weight configured to retain the membrane submerged in the Fenton solution while providing maximum exposure of the membrane to the Fenton solution, means for heating the reaction vessel at a fixed rate, means for maintaining the reaction vessel at a fixed temperature and means for analyzing fluoride ions in the Fenton solution.

Another embodiment disclosed herein of a test assembly for simulating chemical degradation of a polymer electrolyte membrane comprises a reaction vessel having a single sealable opening, a solution of hydrogen peroxide and ferrous ions, two micro-magnetic bars having a non-reactive coating and configured to retain the membrane submerged in the Fenton solution while providing maximum exposure of the membrane to the Fenton solution, an oven and a meter for analyzing fluoride ions in the solution.

BRIEF DESCRIPTION OF THE DRAWINGS

The various features, advantages and other uses of the present apparatus will become more apparent by referring to the following detailed description and drawing in which.

DETAILED DESCRIPTION

Figure 1:
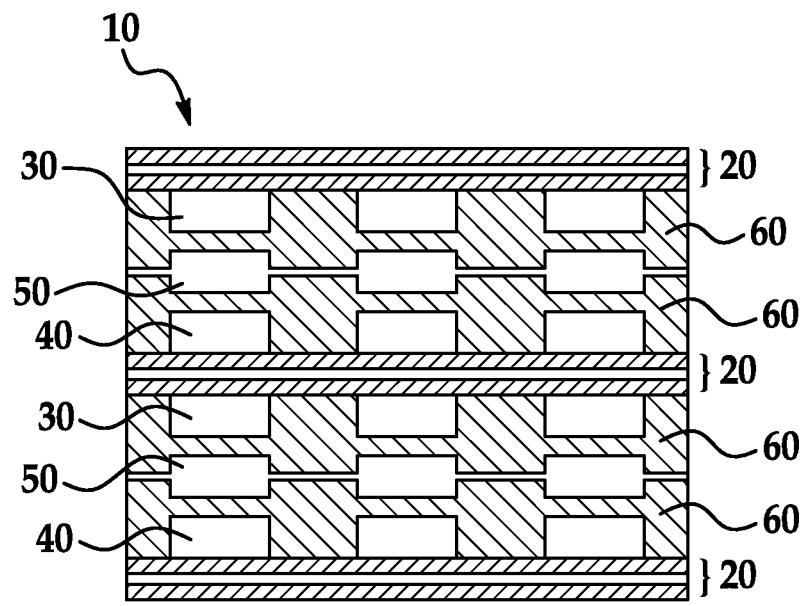
FIG. 1 is a schematic cross-sectional illustration of a basic fuel cell stack having multiple membrane electrode assemblies.

FIG. 1 shows a schematic cross-sectional illustration of a portion of a fuel cell stack 10. The illustration is provided as an example of the fuel cell electrodes and is not meant to be limiting. The fuel cell stack 10 is comprised of multiple membrane electrode assemblies 20. Fuel 30 such as hydrogen is fed to the anode side of a membrane electrode assembly 20, while an oxidant 40 such as oxygen or air is fed to the cathode side of the membrane electrode assembly 20. Coolant 50 is supplied between the fuel 30 and oxidant 40, the coolant 50 separated from the fuel 30 and oxidant 40 by separators 60.

Each fuel cell in the fuel cell stack 10 comprises a catalyst. Conventional PGM catalysts used in fuel cells include particles of an electrically conductive material, typically in powder form, which can comprise, for example, carbon as a support structure supporting a metal which is insoluble or only very slightly soluble in water with low oxidation sensitivity. Non-limiting examples of such a metal include titanium, gold, platinum, palladium, silver and nickel and mixtures thereof. The carbon support of the catalyst is electrically conductive and porous, so that sufficient conductivity and gas-permeability of the catalytic layer is ensured. Carbon minimizes electronic resistance of the electrode while the precious metal serves as the catalyst for the electrochemical reaction.

Figure 2:
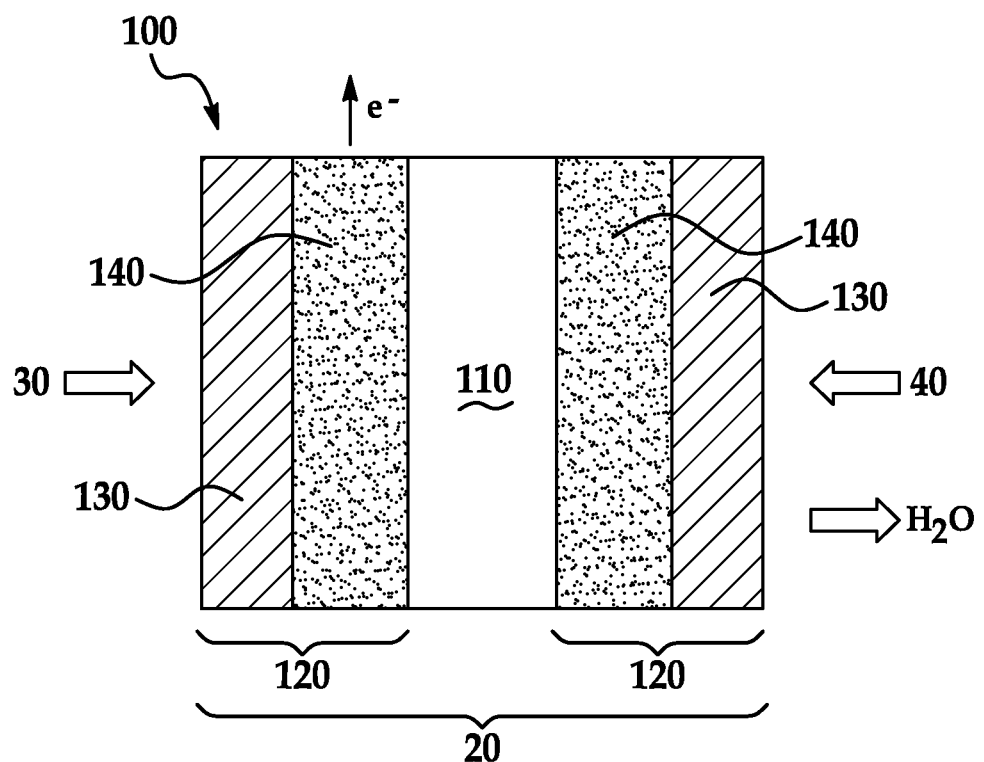
FIG. 2 is an enlarged schematic cross-sectional view of a membrane electrode assembly from the fuel cell stack of FIG. 1.

FIG. 2 is exemplary of one of the plurality of fuel cells 100 in the fuel cell stack 10. The fuel cell 100 can be comprised of a single membrane electrode assembly 20. The membrane electrode assembly 20 has an electrolyte membrane 110 such as a PEM with gas diffusion electrodes 120 on opposing sides of the membrane 110. Each gas diffusion electrode 120 has a gas diffusion layer 130 on which a catalyst layer 140 is formed. Alternatively, the catalyst layers 140 can be directly formed on opposing sides of the membrane 110 and sandwiched between two gas diffusion layers 130. When fuel 30, such as hydrogen gas, is introduced into the fuel cell 100, the catalyst layer 140 of the gas diffusion electrode 120 splits hydrogen gas molecules into protons and electrons. The protons pass through the membrane 110 to react with the oxidant 40, such as air, forming water ($H_2O$). The electrons ($e^-$), which cannot pass through the membrane 110, must travel around it, thus creating the source of electrical energy.

Decomposition of the membrane 110 can lead to gas crossover, membrane breakdown or thinning, reduction in fuel cell efficiency and failure of the fuel cell 100. This decomposition can be due in part to exposure to hydrogen peroxide ($H_2O_2$), which can be formed by oxygen reduction at the cathode side of the membrane electrode assembly 20, represented by $O_2+4H^++2e\rightarrow H_2O_2$. Hydrogen peroxide can also be formed from the crossover of oxygen from the cathode side to the anode side of the membrane electrode assembly 20, represented by $Pt+\frac{1}{2}H_2\rightarrow PtH$ and $2H^++O_2\rightarrow H_2O_2$. The hydrogen peroxide diffuses into the membrane and reacts with metal ion impurities in the membrane to form free hydroxyl radicals (HO. and HOO.), which can attack the polymer and degrade the membrane.

A test assembly using Fenton solution has been developed to determine ex-situ chemical decomposition as described above of membranes used in fuel cells, such as polymer electrolyte membranes (PEMs), and produces accurate, meaningful and reliable results. The test assembly allows estimation of chemical degradation as a function of time due to aggressive and accelerated chemical action of the free hydroxyl radicals under controlled temperature and in an oxygen-free environment. Aqueous hydrogen peroxide solution and ferrous iron ($Fe^{2+}$), i.e. Fenton solution, acting as a catalyst produce free hydroxyl radicals that chemically attack the weak end-groups of polymer chains in the membrane, as shown in the following reaction: $Fe^{2+}+H_2O_2\rightarrow HO.+OH^-$ and $HO.+H_2O_2\rightarrow HOO.+H_2O$. These hydroxyl radicals chemically attack the weak end-groups of the polymer chains in the membrane, resulting in the release of fluoride ions ($F^-$) from the membrane, chemically degrading the membrane. The degree of chemical degradation in a membrane of fixed weight or volume increases with temperature, concentration of aqueous hydrogen peroxide solution, and concentration of ferrous iron.

Figure 3:
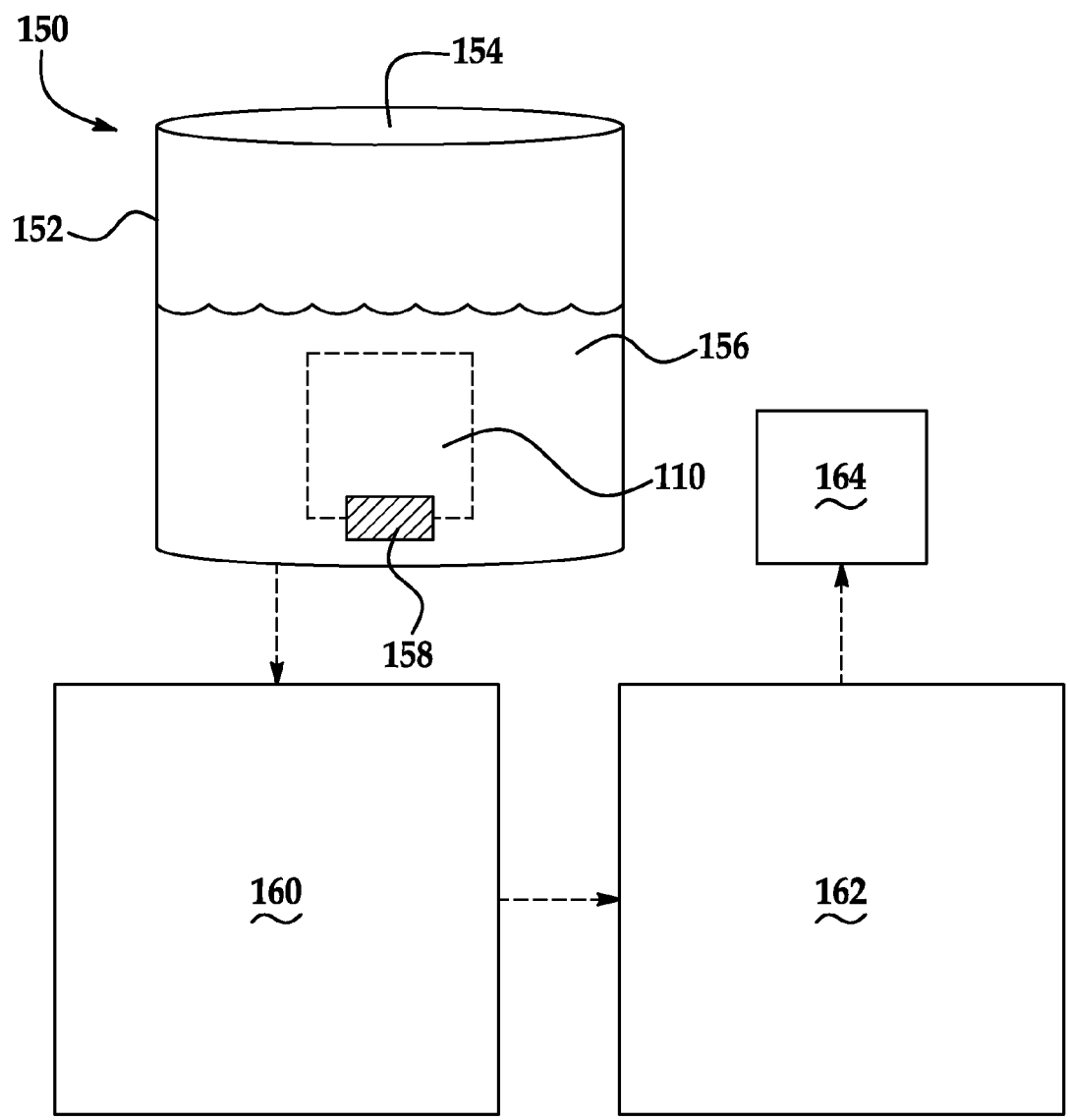
FIG. 3 is a schematic view of a membrane degradation test assembly as disclosed herein.

The test assembly 150 is shown in FIG. 3 that simulates this decomposition by ex-situ chemical degradation of the membranes 110 used in fuel cells 100. This test assembly 150 includes a reaction vessel 152 that can be sealed to prevent vapor loss and maintain the solution concentration constant in the system at any temperature. For example, a reaction vessel 152 with a single sealable opening 154 can be used. The reaction vessel 152 contains Fenton solution 156. A non-reactive weight 158 is used to submerge in the Fenton solution 156 a membrane 110 that is being tested. A means for heating 160 the reaction vessel is employed to heat the Fenton solution 156 in the reaction vessel 152 at a fixed rate. The test assembly 150 also includes a means for maintaining 162 the Fenton solution 156 in the reaction vessel 152 at a fixed temperature. Means for analyzing 164 the Fenton solution is also provided to measure fluoride ions to determine degradation of the membrane 110.

The reaction vessel 152 is partially filled with Fenton solution 156, which is aqueous hydrogen peroxide solution and ferrous iron ($Fe^{2+}$). The Fenton solution 156 can be prepared with aqueous hydrogen peroxide solution and ferrous sulfate heptahydrate ($FeSO_47H_2O$) solution. The ferrous sulfate heptahydrate solution provides $Fe^{2+}$ in the system to catalyze the formation of hydroxyl radicals from hydrogen peroxide.

Figure 4:
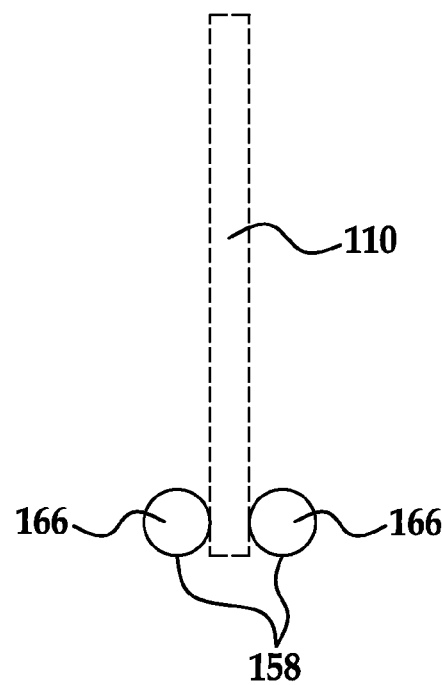
FIG. 4 is a side view of a membrane to which a non-reactive magnetic weight is attached.

A non-reactive weight 158 is used to keep the membrane 110 completely submerged in the Fenton solution 156. The non-reactive weight 158 is configured to provide maximum exposure of the membrane 110 to the Fenton solution 156. One embodiment of the non-reactive weight 158 is shown in FIG. 4. The non-reactive weight 158 can comprise two magnets 166. The use of the magnets 166 allows for attaching and removing of the weight 158 without damaging the membrane 110. The magnets 166 can be a magnetic metal or a flexible magnetic polymer, so long as the polymer has sufficient weight to retain the membrane 110 in the submerged position. The two magnets 166 can also be any combination of polymer and metal. The term "magnet" as used herein refers to two portions with opposite poles facing each other to attract, or one portion being magnetic, and the other portion being made of metal that is attracted to the first portion. The magnets 166 can be covered in a non-reactive coating such as Teflon®. The coating can prevent contamination of the membrane 110 with metal, can prevent degradation of the weight 158, and can ease cleaning of the weight 158 for repetitive use of the weight 158.

The magnets 166 ultimately occupy only a small surface area of the membrane 110 while holding the membrane 110 in place, which provides for uniform degradation of the membrane 110 by ensuring maximum exposure of the membrane 110 to the Fenton solution 156. The magnets 166 obviate the need to employ a glass frame that is difficult and impractical to construct, is easily damaged, can damage the edges of the membrane and occupies a greater surface area of the membrane 110. Metal frames lack chemical stability in the Fenton solution, can damage the edges of the membrane and similarly occupy a greater surface area of the membrane 110. Use of a frame also leads to physical deforming of the membrane at the contact point of the frame and the membrane 110.

A non-limiting example of two magnets 166 is micromagnetic bars used by those skilled in the art as magnetic stirs. These provide sufficient weight to retain the membrane 110 submerged in the Fenton solution 156 while occupying the least amount of surface area of the membrane 110.

The means for heating 160 the reaction vessel can be, as a non-limiting example, an oven. However, other means for heating 160 known to those skilled in the art can be used and are contemplated herein. The means for heating 160 is used to gradually heat the Fenton solution 156 in the reaction vessel 152 at a fixed rate until achieving the desired temperature at which the test will be conducted. Heating the Fenton solution 156 also simulates the pressure of an operating fuel cell. The reaction vessel 152 is sealed so that no vapor escapes the reaction vessel 152 during the heating and testing procedure.

When the desired temperature is reached, the means for maintaining 162 the temperature holds the Fenton solution 156 at the testing temperature for a predetermined period of time during which the membrane 110 degradation is simulated. The means for maintaining 162 the temperature can be the same device as the means for heating 160 or can be different from the means for heating 160. As a non-limiting example, the means for maintaining 162 can be the oven in which the Fenton solution 156 in the reaction vessel 152 is heated, wherein the oven maintains the desired temperature once it is reached. The use of the oven eliminates the need for fluid baths and other methods for maintaining temperature that are relatively difficult to control. However, other means for maintaining 162 the temperature known to those skilled in the art can be used and are contemplated herein.

The means for analyzing 164 the Fenton solution 156 can be, as a non-limiting example, a meter equipped with an ion selective electrode. Other means for analyzing 164 known to those skilled in the art can be used that produce acceptable and reliable results in a short period of time and are contemplated herein. For example, neutron activation analysis or an ion chromatography method can be used but are expensive and challenging for fluoride analysis in hydrogen peroxide-based systems.

Figure 5:
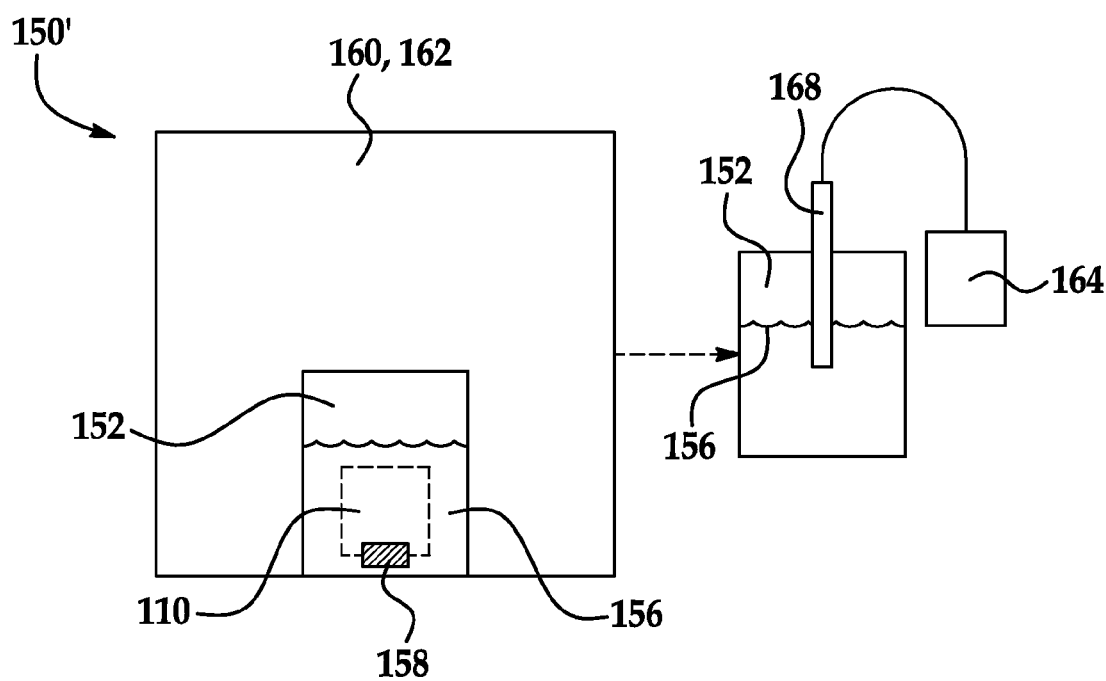
FIG. 5 is a schematic view of another embodiment of a membrane degradation test assembly as disclosed herein.

FIG. 5 illustrates an embodiment of the test assembly 150' wherein the Fenton solution 156 in the reaction vessel 152 is shown in an oven 160, 162 acting as both the means for heating 160 and the means for maintaining 162 the temperature. The reaction vessel 152 and the Fenton solution 156 are removed from the oven 160, 162 when ready for analysis. The means for analyzing 164 is illustrated as a meter equipped with an ion selective electrode 168.

Figure 6:
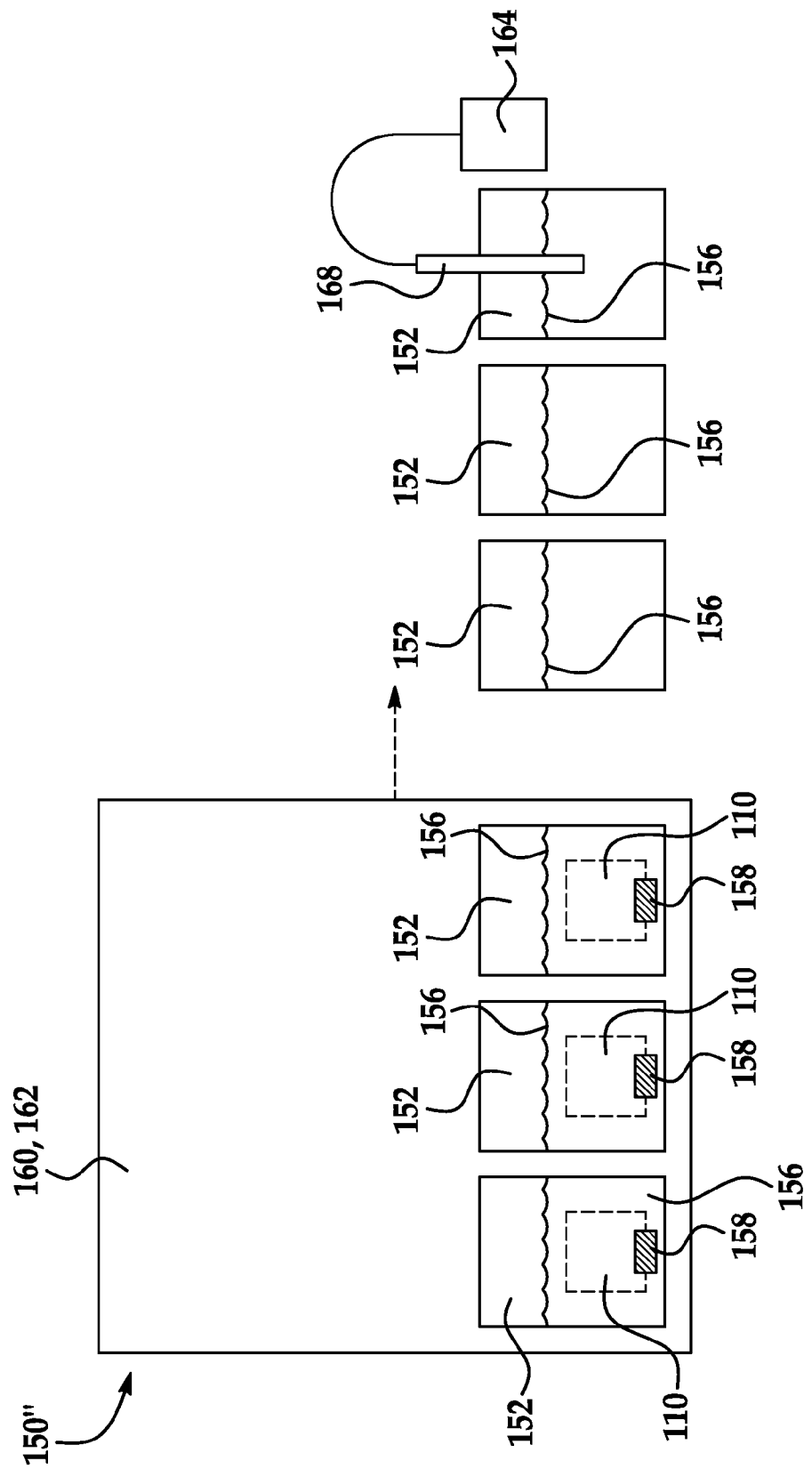
FIG. 6 is a schematic view of yet another embodiment of a membrane degradation test assembly as disclosed herein.

FIG. 6 illustrates another embodiment of the test assembly 150'' wherein a plurality of reaction vessels 152 containing Fenton solution 156 are used, each of the reaction vessels 152 simulating fuel cell membrane degradation on a membrane 110 for different periods of time. Three reactions vessels 152 are shown in FIG. 6 for example only. Any number of reaction vessels 152 can be used to test a respective number of membranes 110. The membranes can be identical and tested for varying predetermined periods of time. Alternatively, different types of membrane can undergo testing of ex-situ chemical degradation under identical measurement conditions. Chemical degradation of different types of membranes can be tested simultaneously in order to rank and screen them for their use in in-situ fuel cell testing.

Figure 7:
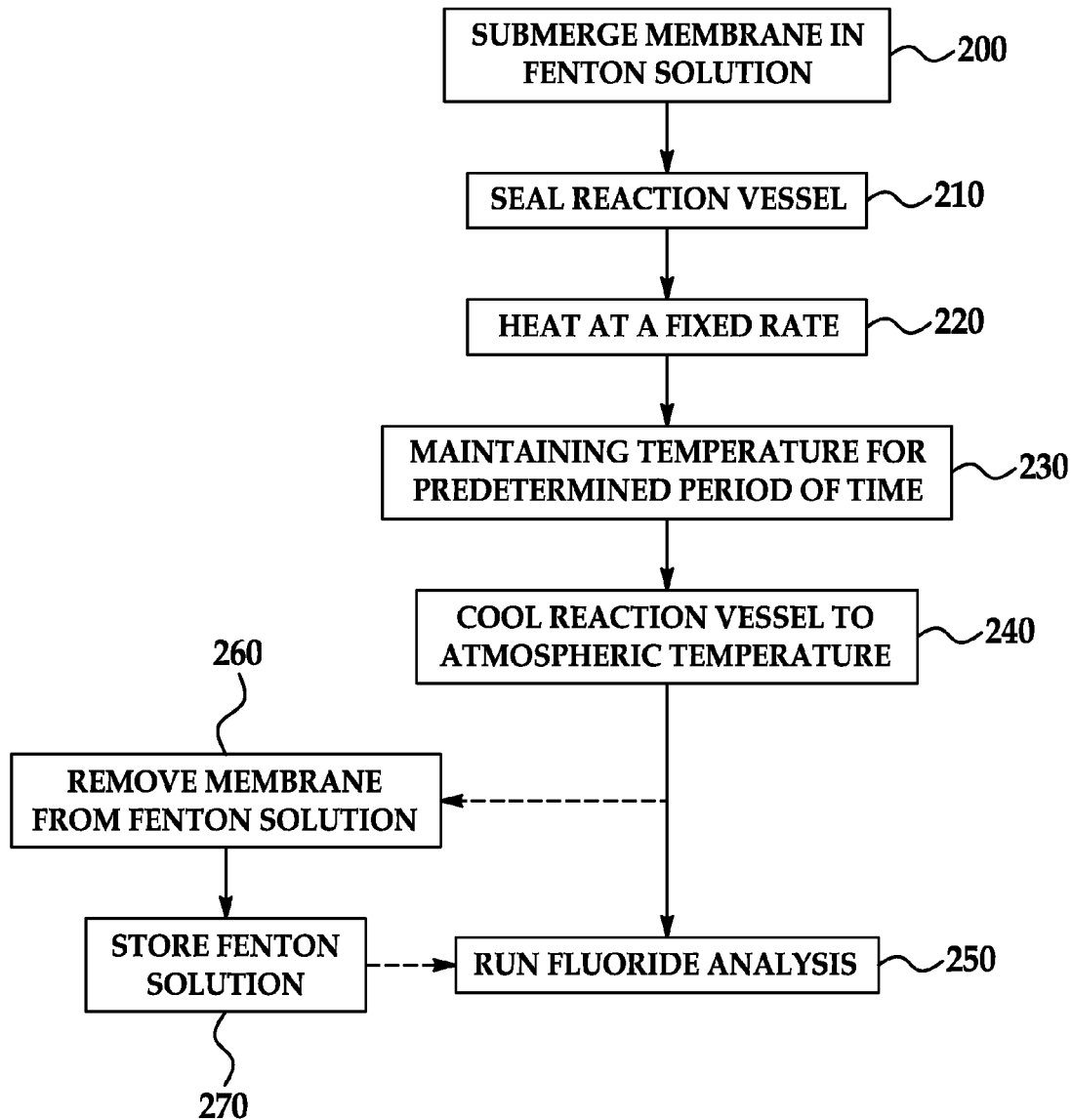
FIG. 7 is a flow diagram of a method of testing membrane degradation.

Also disclosed herein are methods of testing chemical degradation of a membrane 110 using the test assemblies 150, 150', 152'' disclosed herein. One method is described with reference to FIG. 7.

In step 200, a membrane 110 of a predetermined size is completely submerged into the Fenton solution 156 of a reaction vessel 152 by attaching a non-reactive weight 158 to the membrane and letting the weight 158 sink the membrane 110. If micro-magnetic bars are used as the weight 158, each bar is attached with magnetic force on opposing surfaces of the membrane 110. The Fenton solution 156 is at atmospheric temperature.

In step 210, the reaction vessel 152 is sealed completely. If the reaction vessel 152 has a single opening 154, the single opening 154 is tightly sealed. The sealed reaction vessel 152 containing the Fenton solution and weighted membrane 110 is heated gradually in the means for heating 160 at a fixed rate until a predetermined temperature is reached at which the test will be conducted in step 220. As a non-limiting example, the predetermined temperature can be about 80° C.

Once the predetermined temperature is reached, the temperature is maintained with the means for maintaining 162 the temperature for a predetermined period of time in step 230. Non-limiting examples of the predetermined period of time include six hours, sixteen hours and twenty-four hours. For example, with respect to the test assembly 150'', a plurality of reaction vessels 152 having identical contents can be simultaneously exposed to the means for maintaining 162, and then at prescribed periods of duration a remaining one of the plurality of reaction vessels 152 can be retrieved and analyzed to track the progression of membrane degradation over time. When the predetermined period of time has elapsed, the reaction vessel 152 is removed from the means for maintaining 162 and cooled to atmospheric or room temperature in step 240. The cooling process prevents vapor loss during removal of the Fenton solution 156 from the reaction vessel 152, which could result in loss of the fluoride ions and inaccurate test results.

Once cooled, the Fenton solution 156 can undergo fluoride ion analysis in step 250. As shown in step 260, prior to fluoride analysis, the membrane 110 and weight 158 can be retrieved from the reaction vessel 152 if desired, such as if the analysis will not take place immediately after cooling. The Fenton solution 156 can be transferred into another container, for example, an amber glass vial, and stored for fluoride ion analysis, in step 270.

The methods disclosed herein can be performed on a plurality of membranes 110. Multiple samples of the same membrane can be tested for different predetermined periods of time to determine the membrane degradation as a function of time. Alternatively, different membrane compositions can simultaneously undergo testing of ex-situ chemical degradation under identical measurement conditions. The extent of membrane degradation is reported as fluoride emission rate (FER, $\mu g/cm^2/hr$) as a function of time that is obtained from total fluoride ion release ($\mu g$), PEM surface area ($cm^2$), and test duration (hr).

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for evaluating ex-situ chemical degradation of a membrane comprising the steps of:
submerging a membrane in an aqueous hydrogen peroxide solution and ferrous iron (Fenton solution) in a reaction vessel with a non-reactive weight configured to maximize exposure of the membrane to free hydroxyl radicals produced from the Fenton solution;
tightly sealing the reaction vessel;
heating the Fenton solution in the reaction vessel at a fixed rate to a predetermined temperature;
holding the Fenton solution in the reaction vessel at the predetermined temperature for a predetermined test period;
cooling the Fenton solution in the reaction vessel to room temperature;
analyzing the Fenton solution for fluoride ions released from the membrane due to exposure to the free hydroxyl radicals; and
determining a fluoride emission rate from the fluoride ions to obtain membrane degradation.

2. The method of claim 1, further comprising removing the membrane and the non-reactive weight from the Fenton solution prior to analyzing.

3. The method of claim 1, wherein the non-reactive weight comprises two magnets coated in a non-reactive coating placed on opposing sides of the membrane.

4. The method of claim 1, wherein the reaction vessel has a single sealable opening providing access to a cavity of the reaction vessel.

5. The method of claim 1, wherein heating the reaction vessel at a fixed rate is performed in an oven.

6. The method of claim 5, wherein holding the predetermined temperature is performed in the oven.

7. The method of claim 1, wherein the predetermined temperature is 80° C. or greater.

8. The method of claim 1, wherein analyzing the Fenton solution is performed with a meter having an ion selective electrode.

9. The method of claim 1, wherein the steps are performed on a plurality of membranes, each membrane submerged in Fenton solution in a respective reaction vessel with a respective non-reactive weight.

10. The method of claim 9, wherein each of the plurality of membranes are identical and the predetermined test period is different for each of the plurality of membranes.

11. The method of claim 9, wherein the plurality of membranes are each different and the predetermined test period is the same for each of the plurality of membranes.

12. A method for evaluating ex-situ chemical degradation of a membrane comprising the steps of:
- placing two magnets coated in a non-reactive coating on opposing sides of the membrane, each magnet having an arcuate surface that directly contacts the membrane to minimize a contact area;
- submerging the membrane with the magnets in an aqueous solution of hydrogen peroxide and iron catalyst in a reaction vessel, the magnets maximizing exposure of the membrane to free hydroxyl radicals produced from the aqueous solution;
- tightly sealing the reaction vessel;
- heating the aqueous solution in the reaction vessel at a fixed rate to a predetermined temperature;
- cooling the aqueous solution in the reaction vessel to room temperature after a predetermined test period has lapsed;
- analyzing the aqueous solution for fluoride ions released from the membrane due to exposure to the free hydroxyl radicals; and
- determining a fluoride emission rate from the fluoride ions to obtain membrane degradation.

13. The method of claim 12, wherein each magnet is cylindrical in cross-section.

14. The method of claim 12, wherein the reaction vessel has a single sealable opening providing access to a cavity of the reaction vessel.

15. The method of claim 12, wherein the predetermined temperature is 80° C. or greater.

16. The method of claim 12, wherein analyzing the aqueous solution is performed with a meter having an ion selective electrode.

17. The method of claim 12, wherein the steps are performed on a plurality of membranes, each membrane submerged in aqueous solution in a respective reaction vessel with respective magnets.

18. A method for evaluating ex-situ chemical degradation of a membrane comprising the steps of:
- submerging a plurality of membranes in an aqueous solution of hydrogen peroxide and iron catalyst, each membrane submerged in a respective reaction vessel to expose the membrane to free hydroxyl radicals produced from the aqueous solution;
- tightly sealing each reaction vessel;
- heating at a same time the aqueous solution in each reaction vessel at a fixed rate to a predetermined temperature;
- after a first elapsed time, removing one of the respective reaction vessels from the heat and cooling the aqueous solution to room temperature;
- after a second elapsed time, removing another of the respective reaction vessels from the heat and cooling the aqueous solution to room temperature, and continuing removing each reaction vessel after a different elapsed time until the plurality of membranes are cooled;
- analyzing the aqueous solution of each reaction vessel for fluoride ions released from the membrane due to exposure to the free hydroxyl radicals; and
- determining a fluoride emission rate from the fluoride ions to obtain membrane degradation for each of the plurality of membranes.

19. The method of claim 18, wherein a non-reactive weight is attached to each membrane, each non-reactive weight configured to maximize exposure of the membrane.

20. The method of claim 19, wherein the non-reactive weight comprises two magnets coated in a non-reactive coating placed on opposing sides of the membrane, each magnet having an arcuate surface as a contact surface.

* * * * *